Aug. 25, 1959 A. G. LOOFBOURROW 2,901,290
WHEEL MOUNTED VIBRATION DAMPER
Filed April 25, 1958
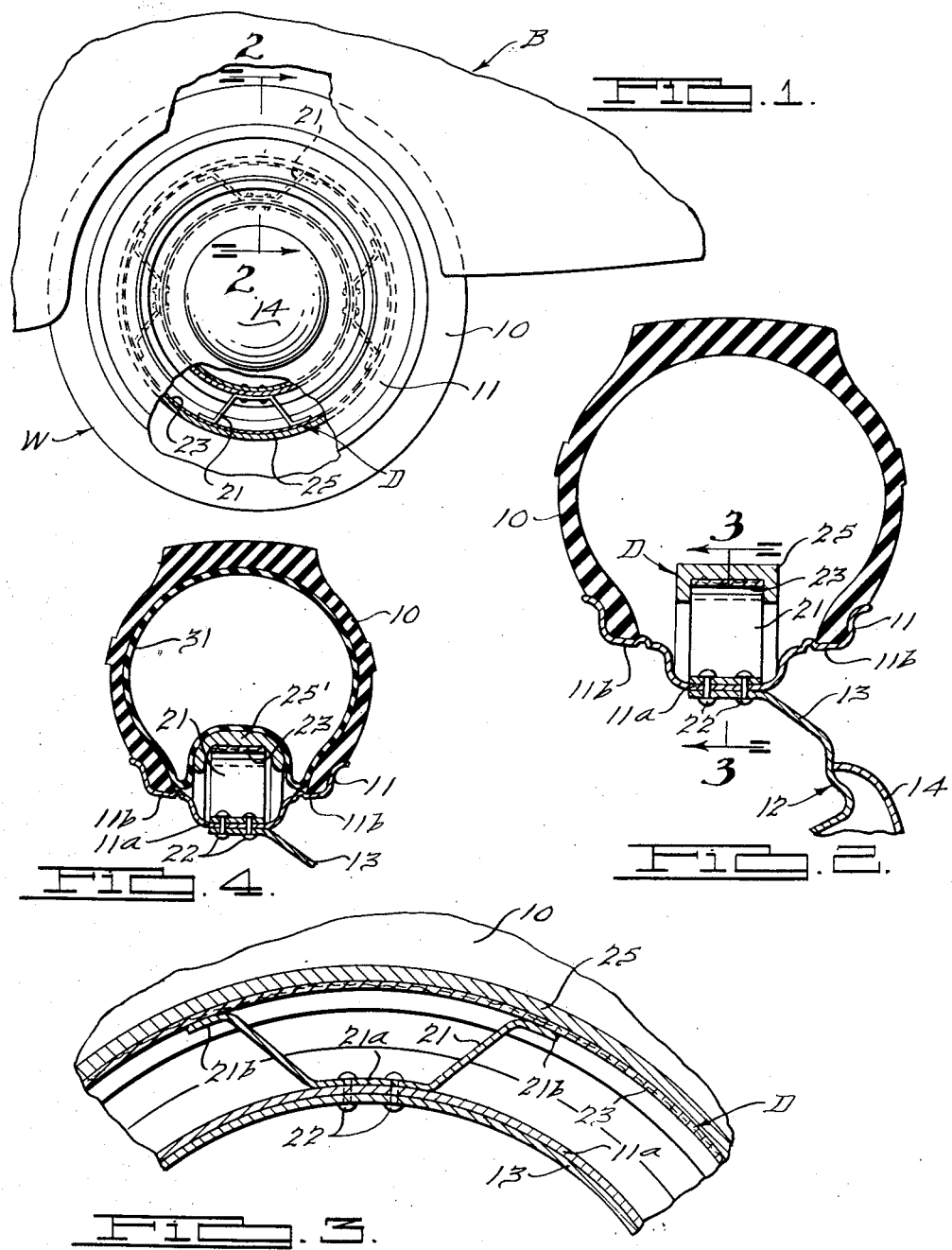
INVENTOR.
Alan G. Loofbourrow,
BY
Harness and Harris
ATTORNEYS.

United States Patent Office 2,901,290
Patented Aug. 25, 1959

2,901,290

WHEEL MOUNTED VIBRATION DAMPER

Alan G. Loofbourrow, Bloomfield Hills, Mich., assignor to Chrysler Corporation, Highland Park, Mich., a corporation of Delaware Application April 25, 1958, Serial No. 730,870

7 Claims. (Cl. 301—5)

This invention relates to a wheel mounted vibration damper and particularly to a friction type vibration damper that is mountable within the air chamber of a pneumatic tire for a vehicle wheel.

It is a primary object of this invention to provide a tuned dynamic absorber for reducing wheel hop that is mountable within the air chamber of a pneumatic tire.

It is another object of this invention to provide a friction type tuned dynamic absorber that will damp vibrations that are transmitted by the wheel connected, unsprung portions, of a motor vehicle.

It is still another object of this invention to provide a friction type vibration damper that is arranged concentrically within the air chamber of a pneumatic tire and mounted on the associated wheel rim.

It is still another object of this invention to provide a tuned dynamic absorber for motor vehicle wheel assemblies that has a novel mounting arrangement and that is simple in construction and readily installed on new or old wheel assembly rims with a minimum of labor and cost.

Other objects and advantages of this invention will become readily apparent from a reading of the following description and a consideration of the related drawings wherein:

Fig. 1 is a fragmentary side elevational view of a motor vehicle wheel assembly with portions broken away to more clearly disclose the invention;

Fig. 2 is an enlarged, fragmentary, sectional elevational view taken along the line 2—2 of Fig. 1;

Fig. 3 is a fragmentary, sectional elevational view, taken along the line 3—3 of Fig. 2; and Fig. 4 is a fragmentary, sectional elevational view, similar to Fig. 2, showing the application of this invention to a wheel having a tube-containing tire.

Fig. 1 of the drawings shows a fragmentary portion of a vehicle body and chassis B adjacent one of the vehicle road wheels W. Wheel W is connected to the associated body B by some type of resilient suspension means (not shown) such as leaf springs, coil springs, air springs, or the like. Wheel W includes an inflatable pneumatic tire 10 that surrounds and seats on the rim 11 of the metal wheel disc generally indicated at 12. Wheel disc 12 includes the rim supporting hub or plate portion 13 that mounts a detachable hub cover 14. Wheel rim 11 includes a depressed well portion 11a that is bounded by a pair of elevated, tire supporting, flange portions 11b. As can be readily seen, the wheel assembly W in Figs. 1–3 utilizes a tubeless tire 10 although it is possible to apply the teachings of this invention to a wheel assembly W' having an inflatable tire that includes a separate inner tube (see Fig. 4).

The nucleus of the invention herein disclosed relates to the combination of a friction type tuned dynamic absorber or vibration damper with a pneumatic tire wheel assembly and specifically to the mounting arrangement of the damper on the rim of the associated wheel disc. It is known that tuned vibration dampers have been suggested for use to reduce wheel hop in motor vehicle wheel suspension systems but it is thought to be novel to mount a tuned dynamic absorber within the air chamber of an inflatable tire of a wheel assembly. By the arrangement shown the tuned vibration damper D is strategically located at the source of wheel hop disturbance and it occupies space that is already being used for another purpose thus there is no space penalty by the addition of this damper device to existing wheel assemblies. Furthermore, the particular vibration damper D is simple in construction and can be readily added to new or existing wheel assemblies at a minimum cost penalty and without any space penalty.

The vibration damper D comprises a plurality of resilient elements 21 that are mounted on and equally spaced around the exterior side of the well portion 11a of the wheel rim 11. In the instance shown the resilient elements 21 are a form of leaf spring but obviously these resilient elements 21 could be coil springs, rubber blocks or a rubber ring, air bags, or the like. The leaf springs 21 have their central or base portions 21a fixedly anchored to the adjacent wheel rim well portion 11a by rivets 22 or some equivalent connection such as bolts or spot welds. The connectors 22 may also be anchored to the adjacent portions of the wheel disc 13, as shown, or merely anchored to the rim 11 alone. Surrounding the resilient elements 21 and seated thereon is a ring of friction material 23. The feet 21b of the resilient leaf spring elements 21 bear against the ring of friction material 23 and preload it against the inertia ring 25 that surrounds and is seated on the ring of friction material 23. The inertia ring 25 is made of some relatively heavy material such as steel or cast iron, or the like, and it functions in the same manner as the inertia weight of any resiliently mounted vibration damper.

From the description of the vibration damper D it is thought to be obvious that there is provided in the air chamber of the wheel tire a secondary vibratory system for the damping or reduction of road induced vibrations such as wheel hop. The tuned dynamic absorber D can be added to any existing wheel assembly without any material modification of either the wheel disc or the associated tire assembly. The resiliently suspended mass of friction material 23 and inertia weight 25 provide a very effective low cost means of reducing road induced vibrations of the road wheels and associated chassis and body structures.

Fig. 4 of the drawings shows the application of this invention to a vehicle wheel inflatable tire that has an inner tube. In this modification the inertia member 25' is of a semi-cylindrical cross-sectional configuration so as to eliminate sharp corners that would rub against the inflatable inner tube 31. All other elements of the Fig. 4 form of the invention are identical to the elements of the Figs. 1–3 form of the invention and bear the same reference numerals.

I claim:

1. In combination, a wheel disc having a rim portion seating an inflatable tire wherein an air chamber is provided between said wheel rim and said tire, and a vibration damper mounted on said wheel rim within said air chamber, said vibration damper comprising a resilient means mounted on said rim, inertia means supported on said resilient means for vibratory movement within said air chamber and friction means mounted on said rim and arranged to damp the movement of said inertia means.

2. In combination, a wheel disc having a rim portion seating an inflatable tire wherein an air chamber is provided between said wheel rim and said tire, and a vibration damper mounted on said wheel rim within said air chamber, said vibration damper comprising a plurality of resilient means mounted on said wheel rim at equally spaced intervals about the rim periphery, a ring of friction material surrounding and seated on said resilient means, and an inertia ring surrounding and seated on said ring of friction material and arranged for vibratory movement.

3. In the combination set forth in claim 2 wherein said resilient means comprise leaf spring elements.

4. In the combination set forth in claim 1 wherein said tire is a tubeless tire.

5. In the combination set forth in claim 1 wherein said tire includes an inflatable inner tube and said vibration damper is arranged concentrically between said wheel rim and said inner tube.

6. A tuned dynamic absorber adapted to be mounted on a wheel rim within the air chamber of an associated inflatable wheel tire comprising a resilient means adapted to be seated on the wheel rim, a ring of friction material adapted to surround the wheel rim and to seat on said resilient means, and an inertia ring to surround and seat on said friction ring.

7. A tuned dynamic absorber adapted to be mounted on the tire enclosed portion of a vehicle wheel rim comprising a plurality of leaf spring elements for mounting on a rim outer periphery, a ring of friction material adapted to be mounted concentrically about and to seat on said leaf spring elements, and an inertia ring adapted to be mounted concentrically about and to seat on the ring of friction material.

References Cited in the file of this patent

UNITED STATES PATENTS

| | | |
|---|---|---|
| 1,962,746 | Lee | June 12, 1934 |
| 2,687,918 | Bell et al. | Aug. 31, 1954 |